May 29, 1934.   R. A. NORBOM   1,961,010
TRUCK ASSEMBLY
Filed Dec. 17, 1930   9 Sheets-Sheet 3

INVENTOR
Ragnar A. Norbom.
BY Toulmin & Toulmin
ATTORNEYS

Patented May 29, 1934

1,961,010

UNITED STATES PATENT OFFICE 1,961,010

TRUCK ASSEMBLY

Ragnar A. Norbom, Cincinnati, Ohio, assignor to The Cincinnati Car Corporation, Cincinnati, Ohio, a corporation of Ohio Application December 17, 1930, Serial No. 503,015

14 Claims. (Cl. 105—192)

This invention relates to truck assembly.

It is the object of my invention to provide a novel form of brake rigging and actuating mechanism therefor having the following objects:—

(a) The location of the brake cylinders directly in line with the brake shoes, in order to get immediate action on the brake shoes for quick braking without lost motion and thereby eliminating extra levers, offsets in levers and push rods heretofore employed when brake cylinders were located inside of the truck dimensions and upon the body.

(b) The locating of the air cylinders on the trucks without increasing the radius of clearance necessary to allow the truck to turn on the car body, thereby eliminating the mounting of air brake cylinders underneath the car body attached to the car body and between the trucks; and consequently making the truck with the brake rigging, with the air cylinder mounted on the truck, a complete self-contained unit with the primary moving parts in alignment.

(c) The pneumatic equalizing of the brake shoe pressure on all four wheels.

(d) An arrangement by which the air brake cylinders can be removed or inspected quickly and easily from the exterior of the truck.

(e) The protection of the air brake cylinders by placing them between transom angles and semi-elliptic springs.

(f) The locating of the cylinders on the truck without increasing the vertical distance from the top of the rail to the underside of the car.

(g) The reduction of the weight of the cars through savings in the number of parts, such as car body brake levers and foundation brake rigging.

(h) The reduction of noise resulting from lost motion in the foundation brake rigging with corresponding efficiency in the life of the parts.

It is also a further object to provide a novel mounting on the trucks of the semi-elliptic springs and of the motors on the trucks.

Referring to the drawings.

Referring to the drawings in detail, 1 indicates the side frames of the truck. These side frames 1 are connected by the spaced transverse transoms 2 and 3 between which is located the bolster 4 upon which is mounted through the blocks 5 the car body 6. The ends of the bolster are connected through the bolts 7 to a housing 8 which contains the rubber block 9 that fits within the housing 10 upon the spring clip 11 that encircles the center of the semi-elliptic spring 12. The end of the bolster rests upon the center of this semi-elliptic spring in the manner indicated. The inner end of the semi-elliptic spring is mounted upon a wear plate 13 having a projection 14 that fits between the rubber blocks 15 carried within the cup 16 of the bracket 17 mounted by the rivets 18 upon the bolster. The other end of the semi-elliptic spring has a wear plate 19 fitting within the blocks 20 carried on the swinging cup 21, which has an arcuate bottom 22 for receiving the bearing 23 and the swinging side link 24 which serves to support the outer end of the spring leaf 12. This link has its upper portion 25 carried in a cradle 26 which is bolted to the ends of the transoms 2 and 3 by the bolts 27. A semi-circular bearing 28 is interposed between this portion of the side link 25 and its bearing support 26. Mounted inwardly of the link 24 in its upper cross piece 25 is the air brake cylinder 29 which is supported on lugs 30 from the plate 31 on the outside of the side frames 1 above the spring 12, so that it is completely surrounded and protected by the spring 12, the link 24, the cover plate 31 and the side frames 1. This cylinder is arranged at an angle to the horizontal so that its piston rod 32 which is pivotally connected at 33 to the lever 34 may actuate it directly. This lever 34 is restrained against outward movement by the helical spring 35 adjustably mounted at 36 on the bracket 37 which is attached by bolts 38 to plate 31, which in turn is mounted upon the transom 2. The lever 34 is pivoted at 41 to the brake shoe support 42 carrying the brake shoes 43. Links 44 serve to support in position this brake shoe support. These links are pivotally connected to the swinging arm 45. One end of lever 34 is inserted in loop 46. The arm 45 is pivotally supported on the bracket 47 which is bolted to side frames 1. An adjustable link 48 connects the lower end of the lever 34, as at 49, to another lever 50 at 51, which in turn, through similar link mechanism, actuates the brake shoe 52. 53 indicates the wheels. The wheels are mounted on the axle 54. These axles in turn carry the spring supporting yoke 55 which has a cup on either side 56 for receiving the helical springs 57, the upper ends of which are attached by the bolts 58 to the ends of the side frames 1. The yoke 55 is pivotally mounted upon the free end of the link 59, which in turn is pivoted at 60 upon the bracket 60a which is attached to the transom. This constitutes the driving connection.

All of the brake rigging is actuated from a common linkage engaging the lever 34, such as the main actuating link 61, the yoke 62, which is guided by the bracket 63 and terminates in the slotted end 64 for receiving the upper end of the lever 34.

Figure 1:
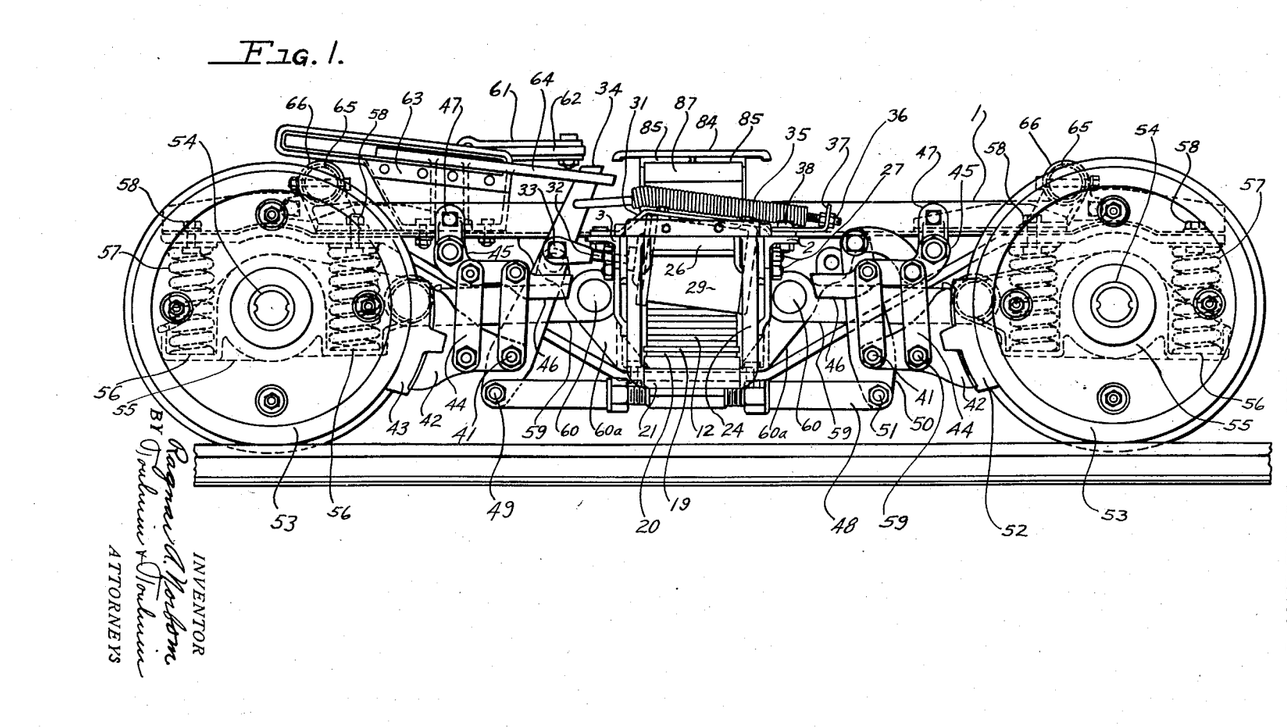
Figure 1 is a side elevation of the truck.
Figure 2:
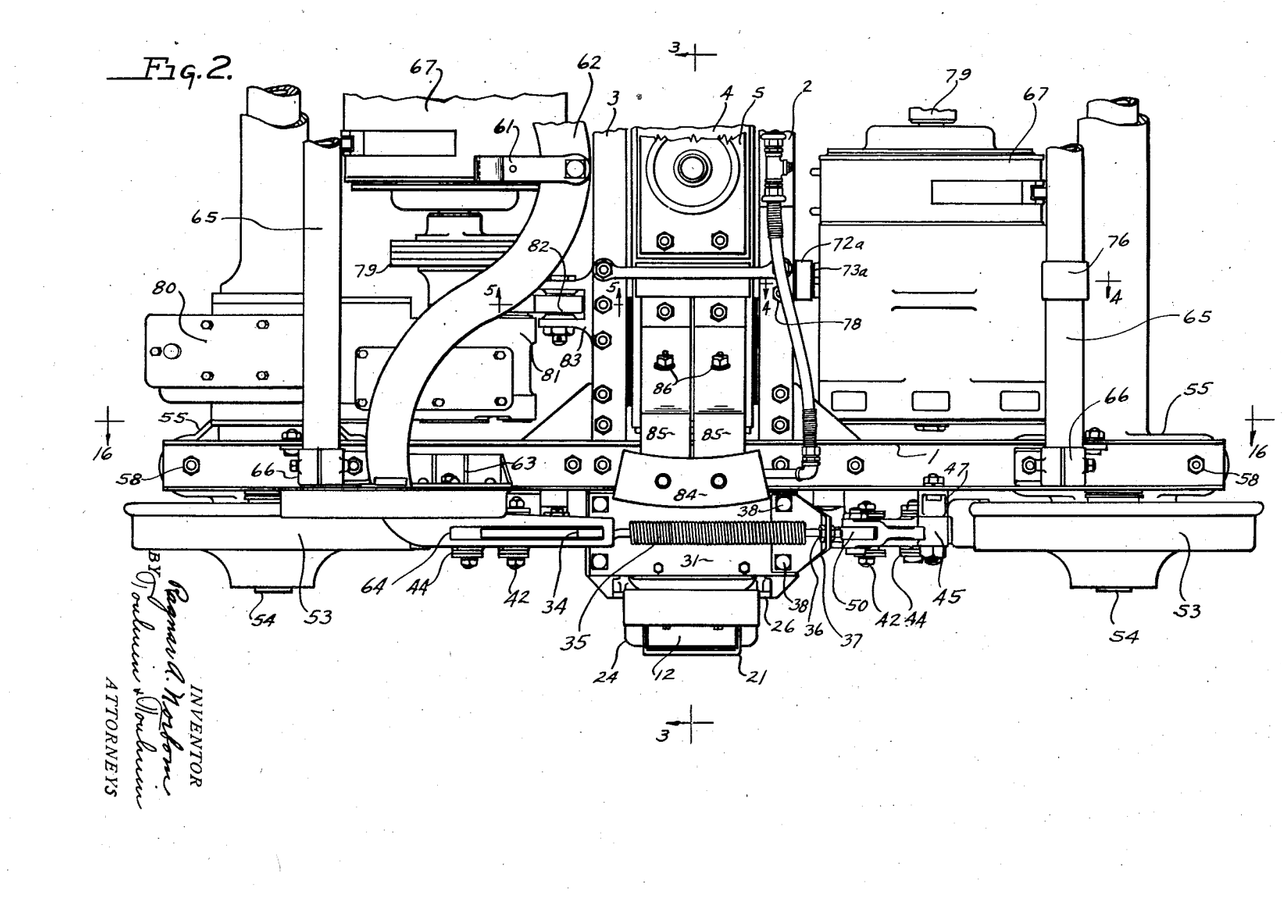
Figure 2 is a top plan view thereof.
Figure 3:
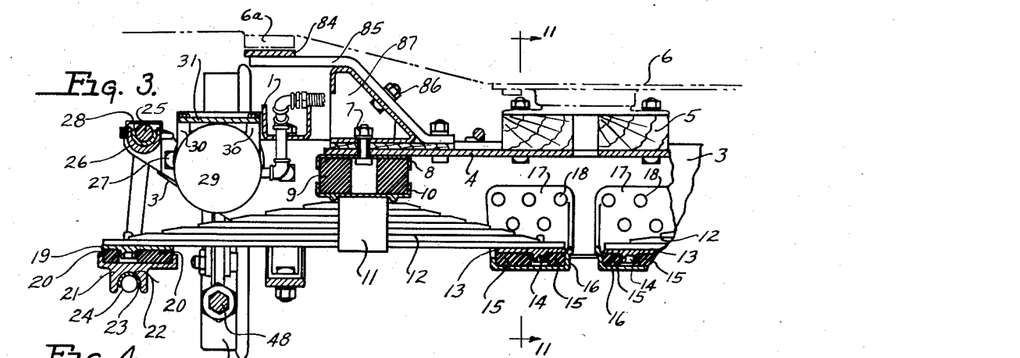
Figure 3 is a section on the line 3—3 of Figure 2.
Figure 4:
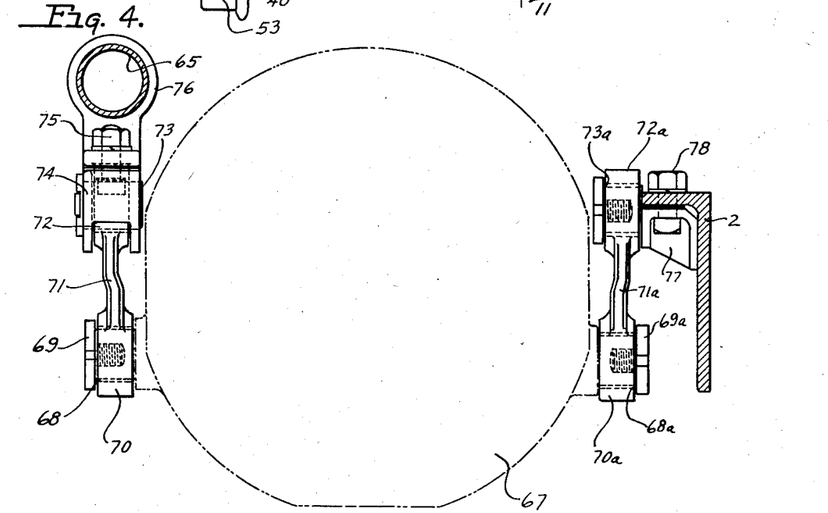
Figure 4 is a section on the line 4—4 of Figure 2.
Figure 5:
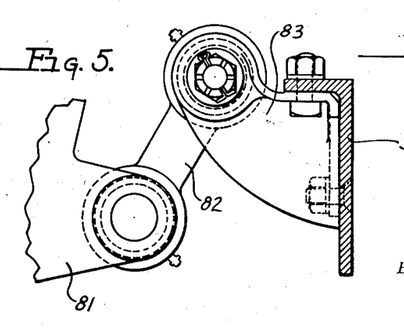
Figure 5 is a section on the line 5—5 of Figure 2.
Figures 6, 7:
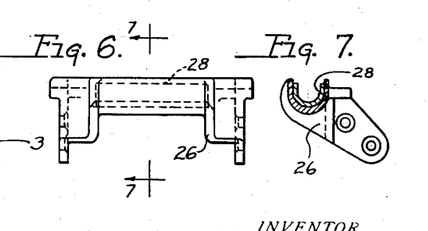
Figure 6 is a detail view in elevation of the link bracket.
Figure 7 is a section on the line 7—7 thereof.
Figures 8, 9, 10, 11, 12, 13:
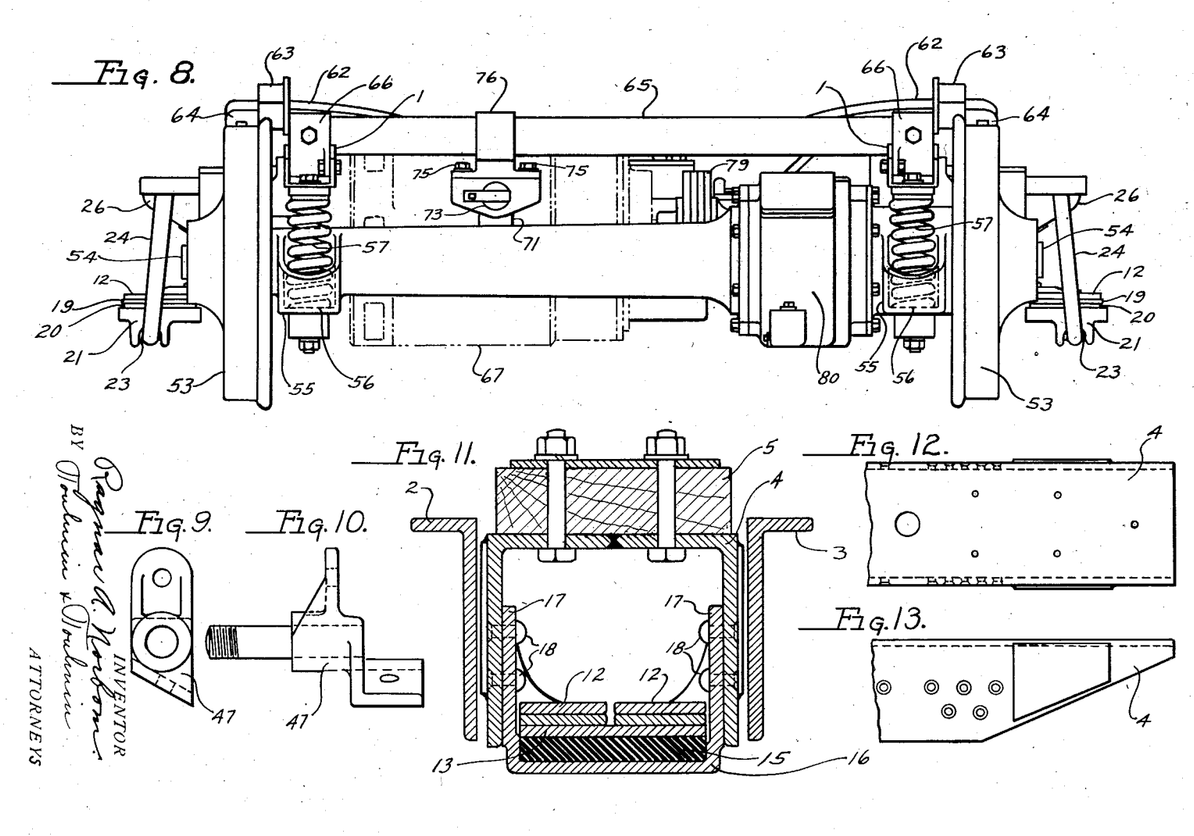
Figure 8 is an end elevation of the truck.
Figure 9 is an end elevation of the brake hanger support.
Figure 10 is a side elevation.
Figure 11 is a section on the line 11—11 of Figure 3.
Figure 12 is a top plan view of one end of the bolster.
Figure 13 is a side elevation of one end of the bolster.
Figures 14, 15, 16, 17, 18, 19:
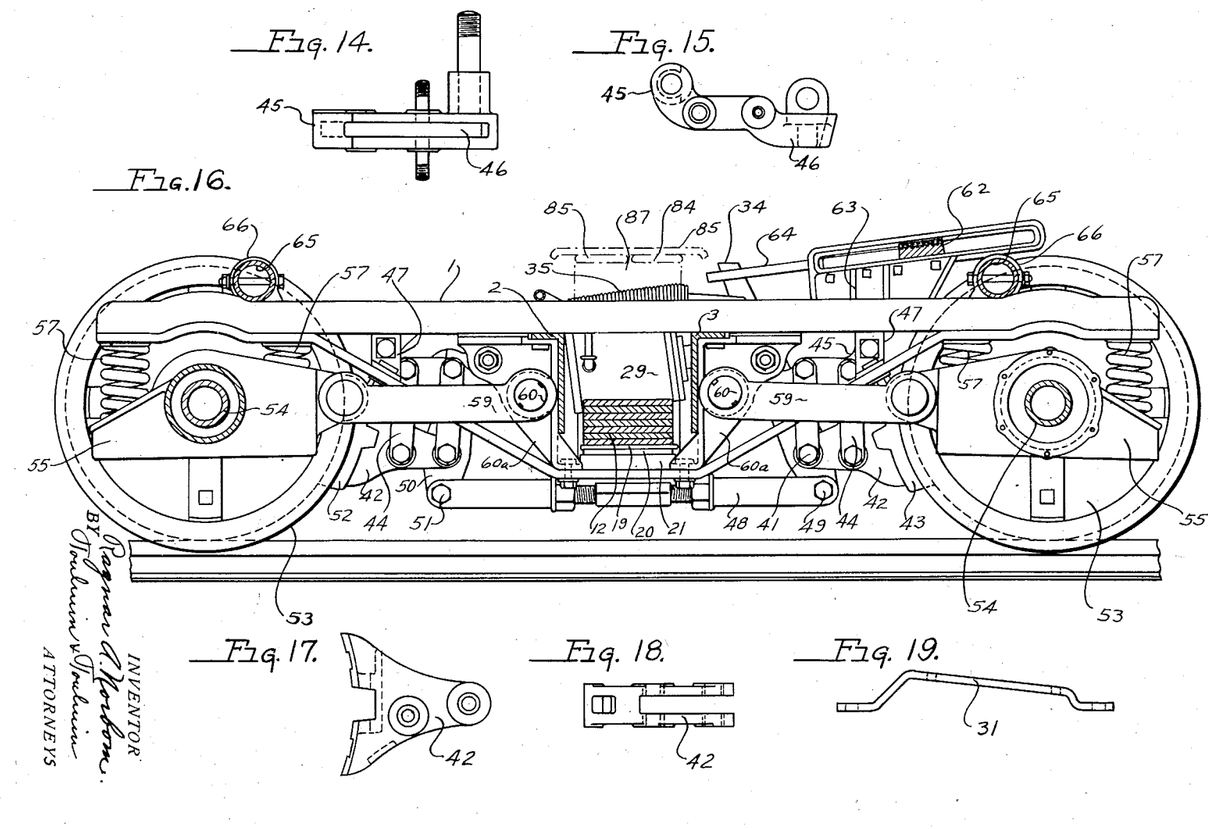
Figure 14 is a top plan view of the brake hanger casting.
Figure 15 is a side elevation thereof.
Figure 16 is a section on the line 16—16 looking in the direction of the arrows in Figure 2.
Figure 17 is a detail side elevation of the brake shoe support.
Figure 18 is a top plan view thereof.
Figure 19 is a side elevation of the brake cylinder support.
Figure 20:
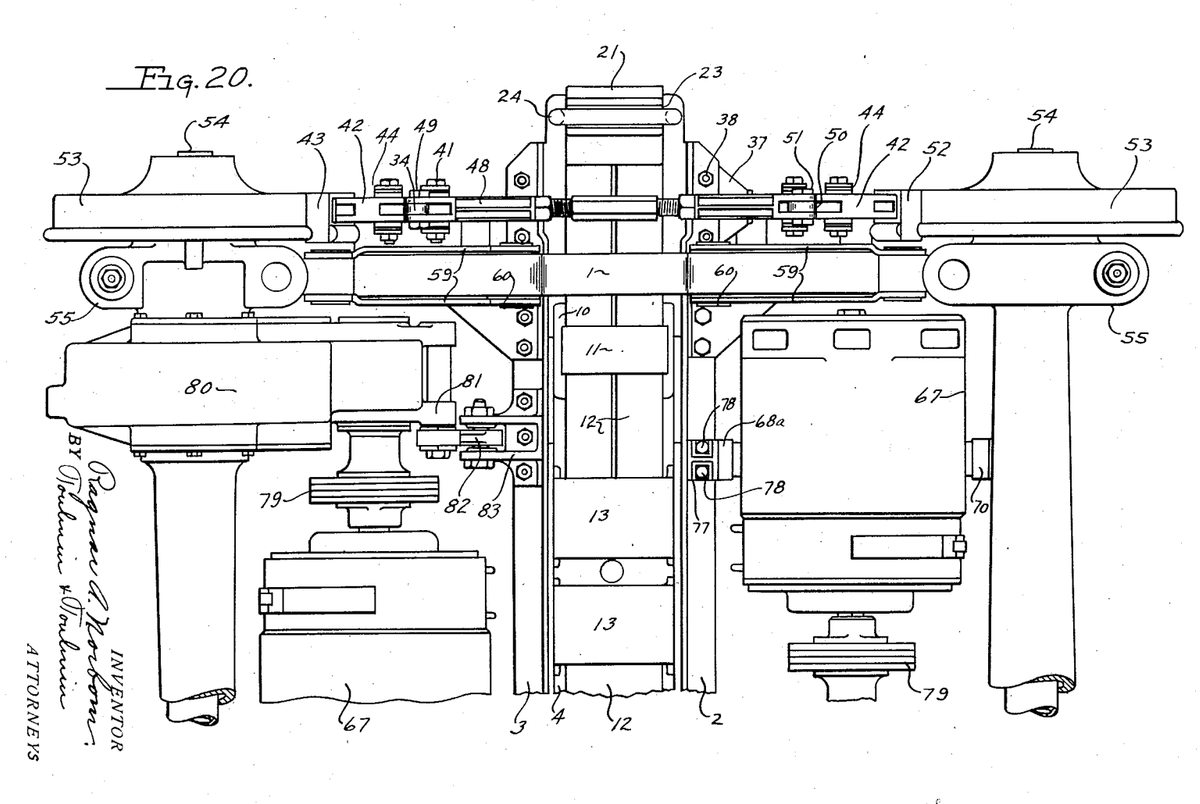
Figure 20 is a bottom plan view of half of the truck.
Figure 21:
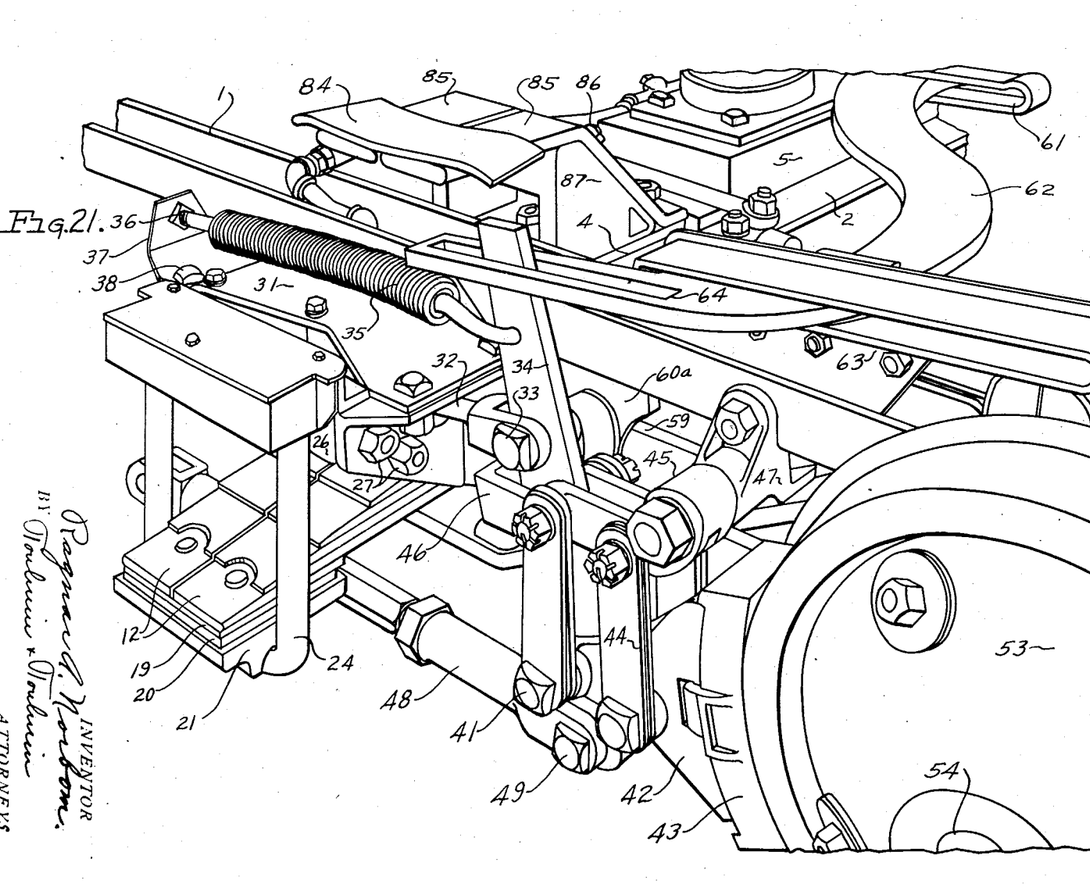
Figure 21 is a detail perspective of the exterior of the truck view from one corner thereof.
Figure 22:
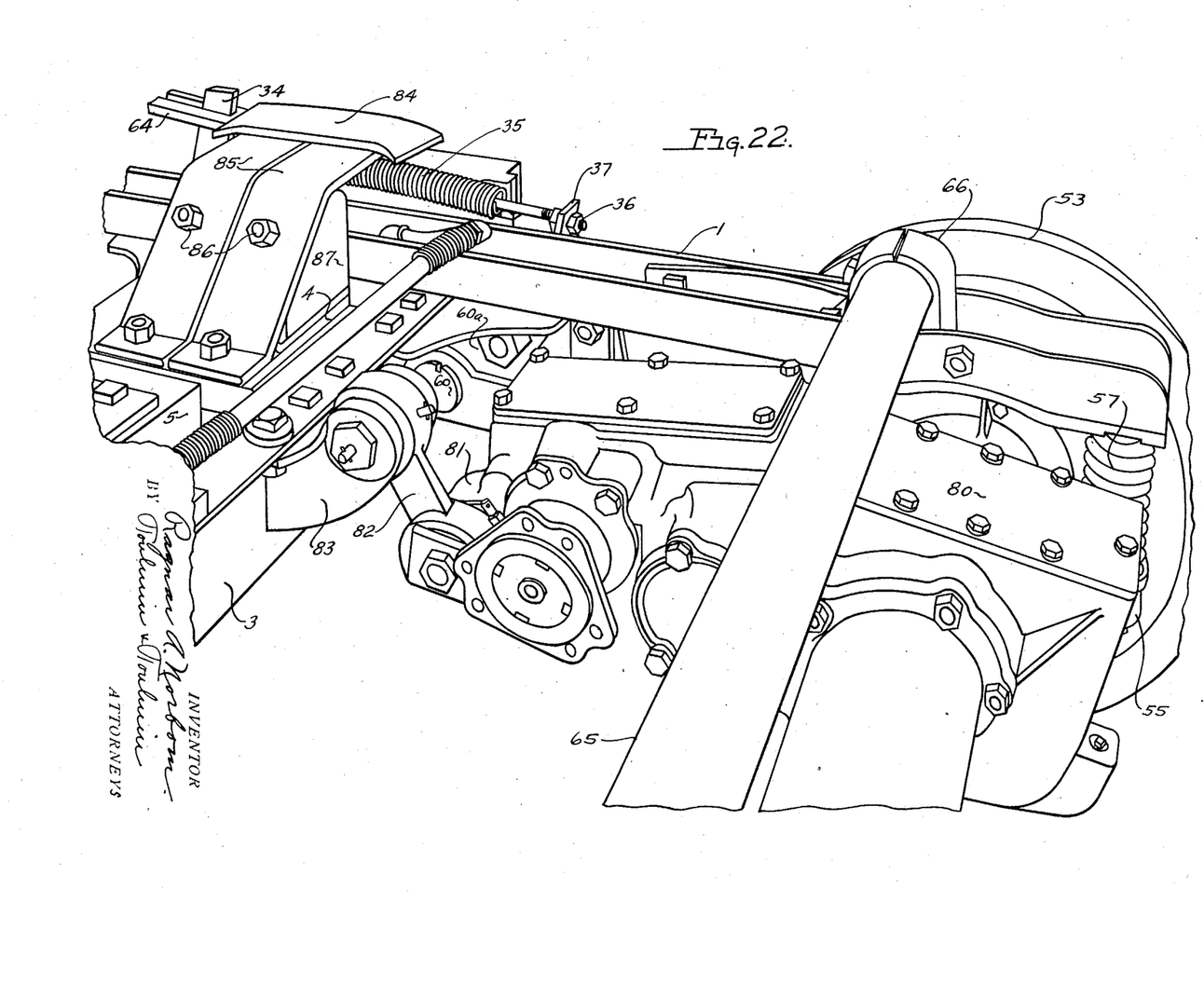
Figure 22 is a detail of the inside perspective showing the driving connection portion of the motor support.

The motor driving suspension is arranged as follows. The transverse tubular members 65 are mounted in bracket 66 upon the side frames. The motor 67 is provided with a lateral extending bearing shaft 68 and a detachable head 69 therefor, which retains in position a collar 70 formed on the lower end of a link 71, the upper end of which is provided with a collar 72 mounted on the stud 73, which is carried in a pair of spaced eyes 74 that are bolted by the bolts 75 to the bottom of the strap 76 which encircles the tubular member 65.

Figure 23:
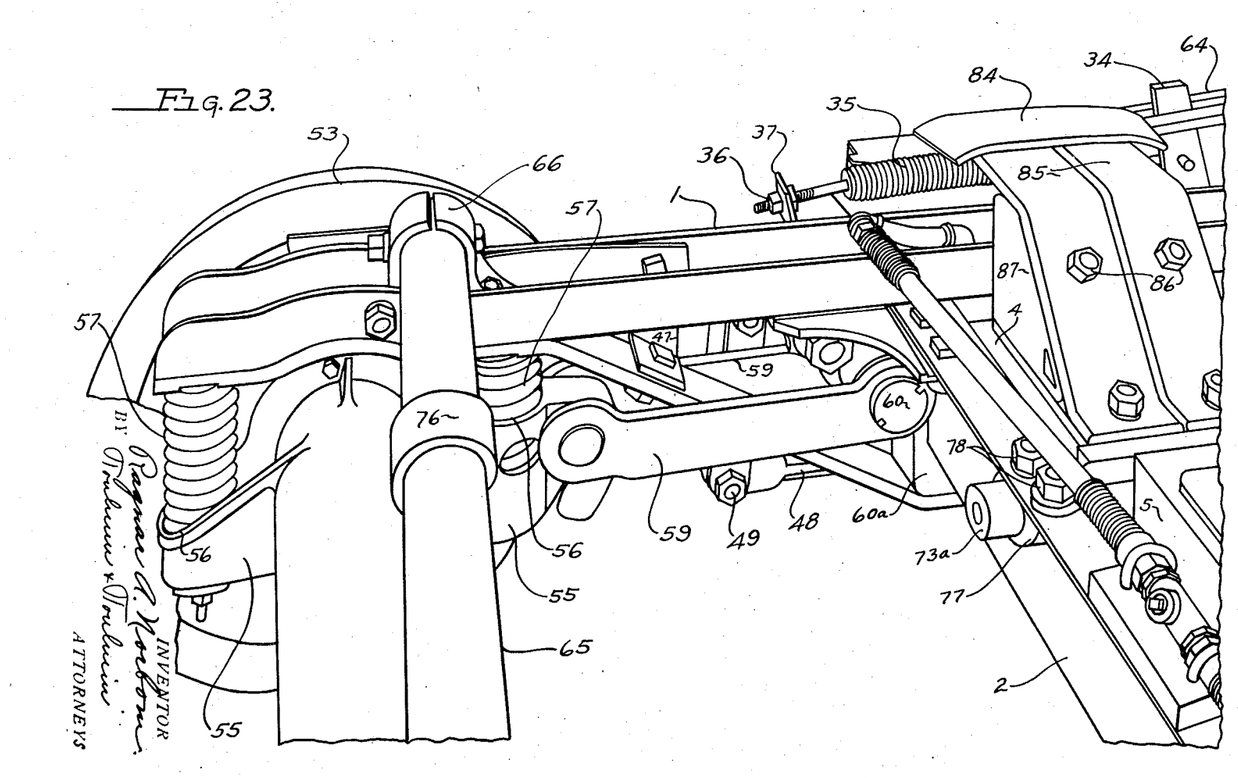
Figure 23 is an inside perspective looking from the center of the truck outwardly, illustrating in detail the driving link and its connections.

On the side of the motor 67 is a similar projection to that of 68 on the other side and designated 68a with a detachable cap 69a and a link 71a having a lower collar 70a and an upper collar 72a mounted upon a stub shaft 73a. This stub shaft is mounted between a bracket 77 attached by the bolts 78 to either of the transoms 2 or 3. The motor armature driving connection is indicated at 79 whence it drives through the suitable gears in the gear box 80. The gear box is pivotally supported by the ear 81 engaging with a swinging link 82 which is pivotally mounted upon a bracket 83 upon one of the transoms 2 or 3.

The body 6 has a wear plate 6a that is adapted to engage with the plate 84 carried on a bracket 85 that is bolted to the bolster 4 through the bolts 86. This bracket is supported by a triangle frame 87.

It will be noted that the brake cylinder and the linkage directly attached to it are substantially in alignment between the wheels. There is a direct application of power. Interconnecting linkage and compensating mechanism heretofore found necessary when the air cylinder was mounted on the underneath of the car body, are eliminated. The truck is a complete unit. When it is desired to make repairs to the air cylinder or to the brake linkage, ready access is secured from the exterior of the truck for this purpose. A quick removal of the apparatus can be effected by disengaging a few bolts. Adjustments and repairs can be made without getting underneath the vehicle and between the trucks and vehicle. At the same time the air cylinder and brake rigging are suitably protected from damage.

The spring suspension between bolster, transom and side frames is so arranged that the overall length of the truck and the overall height of the truck have not been increased. The air cylinder is protected by the springs on the lower side. The relative movement of the side frame, the transom and the bolster is accommodated without reducing the size and length of the spring necessary for the easy riding of the vehicle.

It will be understood that I desire to comprehend within my invention such modifications as may be clearly embraced within the scope of my claims and invention.

Having thus fully described my invention, what I claim as new and desire to secure by Letters Patent, is:

1. In combination in a truck, side frames, transoms, a bolster, spring means supporting said bolster and connected to said side frames, brake rigging and an air cylinder over the spring for actuating said brake rigging.

2. In combination in a truck, side frames, transoms, a bolster, spring means supporting said bolster and connected to said side frames, brake rigging and an air cylinder for actuating said brake rigging, said air cylinder being mounted over the spring on the outside of said truck beyond the bolster.

3. In combination in a truck, side frames, transoms having ends extending beyond the side frames, a bolster, spring means supporting said bolster and connected to said side frames, brake rigging and an air cylinder for actuating said brake rigging, said air cylinder being mounted on the outside of said truck beyond the bolster between the extended ends of the transoms and outside of the side frames.

4. In combination in a truck, side frames, transoms, a bolster, a spring means supporting said bolster and connected to said side frames, brake rigging and an air cylinder for actuating said brake rigging, said air cylinder being mounted on the outside of said truck beyond the bolster between the ends of the transoms and outside of the side frames and between the outside of the frame and the end of the spring.

5. In combination in a truck, side frames, transoms, a bolster, spring means supporting said bolster and connected to said side frames, brake rigging and an air cylinder for actuating said brake rigging, said air cylinder being mounted on the outside of said truck beyond the bolster between the ends of the transoms and outside of the side frames and between the outside of the frame and the end of the spring and above the spring.

6. In combination in a truck having axles and wheels, spaced side frames, transverse transoms, a floating bolster between said transoms, transversely arranged leaf springs supporting the respective end of said bolster, means of supporting the inner end of said spring on said bolster, means for supporting the outer end of said spring on said side frames, brake rigging and an air cylinder supported by said side frames on the outside thereof and inside the spring support.

7. In combination in a truck having axles and wheels, spaced side frames, transverse transoms, a floating bolster between said transoms, transversely arranged leaf springs supporting the respective ends of said bolster, means of supporting the inner end of said spring on said bolster, means for supporting the outer end of said spring on said side frames, brake rigging and an air cylinder supported by said side frames on the outside thereof between the means for supporting the outer end of the spring and the springs.

8. In combination in a truck having axles and wheels, spaced side frames, transverse transoms, a floating bolster between said transoms, transversely arranged leaf springs supporting the respective ends of said bolster, means of supporting the inner end of said spring on said bolster, means for supporting the outer end of said spring on said side frames, brake rigging and an air cylinder supported by said side frames on the outside thereof between the means for supporting the outer end of the spring and the springs, said brake rigging and said air cylinder being arranged in alignment with said wheels.

9. In combination in a truck having axles and wheels, spaced side frames, transverse transoms, a floating bolster between said transoms, transversely arranged leaf springs supporting the respective ends of said bolster, means of supporting the inner end of said spring on said bolster, means for supporting the outer end of said spring on said side frames, brake rigging, an air cylinder supported by said side frames on the outside thereof between the means for supporting the outer end of the spring and the springs, said brake rigging and said air cylinder being arranged in alignment with said wheels and yielding means arranged on the outside of said truck for resisting the movement of the brake rigging as actuated by said air cylinder.

10. In combination in a truck having wheels and axles in spaced relationship, side frames mounted on said axles, transverse transoms connected to said side frames, a bolster therebetween, semi-elliptic springs mounted on said bolster at either end thereof transversely of the truck between said transoms, means to support the inner end of said spring, swinging means to support the outer end of said spring, brake rigging on the outside of said side frame, air cylinder on the outside of said side frames aligned with said brake rigging, said air cylinder being supported on said truck above the spring.

11. In combination in a truck having wheels and axles in spaced relationship, side frames mounted on said axles, transverse transoms connected to said side frames, a bolster therebetween, semi-elliptic springs mounted on said bolster at either end thereof transversely of the truck between said transoms, means to support the inner end of said springs, swinging means to support the outer end of said spring, brake rigging on the outside of said side frames, an air cylinder on the outside of said side frames within the spring support aligned with said brake rigging, and springs interposed between said axles and said side frames.

12. In combination in a truck having wheels and axles in spaced relationship, side frames mounted on said axles, transverse transoms connected to said side frames, a bolster therebetween, semi-elliptic springs mounted on said bolster at either end thereof transversely of the truck between said transoms, means to support the inner end of said springs, swinging means mounted on the side frames for supporting said outer end of said springs, brake rigging on the outside of said side frames, and an air cylinder mounted between the swinging means and the outside of said side frames aligned with said brake rigging.

13. In combination in a truck having axles and wheels, side frames interconnecting transverse spaced transoms, a bolster therebetween supporting a car body intermediate the ends thereof, semi-elliptic springs attached to the bolster, means connected to the said side frames for supporting a swinging link, a swinging link swinging transversely the length of the truck adapted to support the outer end of said leaf springs, an air cylinder arranged above said leaf spring between said link and said side frame and brake means actuated by said cylinder in alignment therewith.

14. In combination in a truck having axles and wheels, side frames interconnecting transverse spaced transoms, a bolster therebetween supporting a car body intermediate the ends thereof, semi-elliptic springs attached to the end of said bolster, means connected to the said side frames for supporting a swinging link, a swinging link swinging transversely the length of the truck adapted to support said springs, an air cylinder arranged above said leaf springs between said link and said side frames, brake means actuated by said cylinder in alignment therewith and a wear plate mounted on said bolster at either end thereof for maintaining the car body from tilting and engaging the wheels and air cylinder.

RAGNAR A. NORBOM.